United States Patent Office 3,412,944
Patented Nov. 26, 1968

3,412,944
PROCESS FOR PRODUCING TITANIUM
DIOXIDE PIGMENTS
Thomas S. Wollenberg, Brandywine Hundred, Del., assignor to E. I. du Pont de Nemours and Company, Wilmington, Del., a corporation of Delaware
No Drawing. Filed Aug. 3, 1965, Ser. No. 477,027
2 Claims. (Cl. 241—5)

ABSTRACT OF THE DISCLOSURE

In processes for producing titanium dioxide pigments having improved gloss, hiding power and dispersibility of titanium dioxide pigment by double pass grinding in a fluid energy mill with the addition of a grinding aid, triethanolamine, prior to the second pass, the improvement which comprises (1) grinding a titanium dioxide pigment in a fluid energy mill, (2) adding 0.1 to 1.0% by weight, based on the weight of the original pigment of triethanolamine, and (3) grinding the so-treated pigment in a fluid-energy mill at a controlled energy level in the range of 0.5:1 to 2:1 weight ratio of steam to pigment.

One method of manufacturing commercial titanium dioxide pigments comprises precipitating the titania by hydrolyzing an aqueous solution of a titanium salt such as the sulfate, followed by filtering and washing the hydrolysate and treating it in the wet state with minor amounts of various agents, and then calcining it at temperatures ranging from 750°–1000° C. to develop essential pigment properties. The resulting calcined product contains some hard, gritty particles which can be dispersed by either wet or dry grinding methods. Another process for producing titanium dioxide pigments comprises the oxidation, at relatively high temperatures, of a titanium halide, particularly titanium tetrachloride. Pigmentary titanium dioxide is directly obtained from this chloride process, but because of the gritty material which also exists in this product, a grinding treatment also must be applied to it. In some cases the chloride-type pigment is subjected to a wet treatment where minor amounts of agents are added, and the resulting slurry is filtered and dried, followed by milling in order to remove coarse aggregates.

This invention is concerned with the final grinding operation, and in this particular case with the grinding operation carried out in a fluid energy type mill, such as the micronizer mill described in U.S. Patent 2,032,827. These fluid energy machines are capable of reducing the size of pigment aggregates to an extent such that better gloss is obtained than is obtainable by other methods of dry grinding. Breaking up of the aggregates in order to develop pigments with improved gloss and hiding power may be accomplished by increasing the fluid energy input of micronizing, as disclosed in U.S. Patent 3,178,121. Micronizer energy can be increased by increasing the steam flow or decreasing the pigment feed rate, both of which are equivalent to increasing the S/P ratio (# steam/# pigment). While significant improvements in gloss and hiding power have been accomplished by increasing the S/P ratio, in most cases a corresponding degradation in the dispersion of the pigment in paints and enamels has resulted.

Previously, various combinations of materials have been added to titanium dioxide pigments to improve gloss: triethanolamine and benzoic acid (U.S. Patent 3,172,772); triethanolamine and perchloric acid (U.S. Patent 3,147,131); and triethanolamine and silica aerogel (U.S. Patent 2,737,460). Combinations have also been added to improve the dispersion of titanium dioxide pigments: Salt of a water-soluble tertiary amine (triethanolamine benzoate) (U.S. Patent 3,015,573) and treithanolamine and formic acid (U.S. Patent 2,744,029). None of these has proved satisfactory for the purposes of this invention, because in the cases where there was an improvement in gloss, there was not a corresponding improvement in dispersibility, and vice versa.

An object of this invention is to prepare titanium dioxide pigments which combine high gloss values with good dispersibility. Further objects include the provision of a novel process for finishing titanium dioxide pigments so that they possess superior gloss, superior hiding power, and improved dispersibility.

Now according to the present invention it has been found that the foregoing and related objects are accomplished and titanium dioxide pigments having both improved gloss characteristics and good dispersion properties are obtained by processes comprising grinding the pigment in a fluid energy mill, followed by adding a small amount, from 0.1 to 1.0%, based on the weight of the pigment, of triethanolamine, and regrinding the pigment in a fluid energy mill at a controlled energy level.

More specifically, and in a preferred aspect, the invention comprises grinding the titanium dioxide pigment in a micronizer mill using high pressure steam as the source of energy, treating the ground pigment with the triethanolamine by dripping a 50% triethanolamine-water solution onto the ground pigment prior to its second pass through the micronizer mill, sufficient triethanolamine-water solution being added so that 0.3 to 0.5%, based on the weight of the pigment, of triethanolamine is absorbed on the surface of the ground pigment particles, and then regrinding the treated pigment in a micronizer mill, thereby dispersing the triethanolamine throughout the pigment.

Titanium dioxide pigment prepared by either the aqueous solution hydrolysis method as described in U.S. Patents 2,511,218, 2,479,637, 2,369,246 and 2,387,534 or the vapor phase oxidation process as described in U.S. Patents 2,791,490 and 2,559,638 contains hard gritty material which must be broken up by a final grinding operation. The invention is applicable to, and may start with, any such pigmentary titanium dioxide.

Since the invention is primarily concerned with the improvement of gloss and dispersion the following tests are given to define and explain the improvements derived from this invention.

GLOSS

"Gloss" is a term used to describe the optical smoothness of a reflecting surface such as that of an enamel or paint. The gloss of a paint surface is affected by coarse particles in the pigment used. The quality of a pigment, in this respect, is best observed by actually preparing the paint under standardized conditions and optically examining the surface. For example, the products of this invention and a control pigment were incorporated in a gloss-sensitive, alkyd-amino resin vehicle (an automotive baking enamel) and the mixtures were thinned with volatile solvent to spraying consistency and sprayed onto panels. After drying and baking, the panels were compared in a standardized gloss meter. In the gloss meter a focused light beam was directed onto the enamel surface at a 20 degree incident angle. A photoelectric meter was positioned to intercept the reflected beam and measure its intensity. Higher readings on the meter indicated the better gloss since surface imperfections cause diffuse reflection which does not reach the photometer. The gloss meter was standardized with respect to the intensity of incident light and the portion of reflected light reaching the photocell, against a polished glass plate corresponding to a value on an arbitrary gloss scale. The improved pigments of this invention and the control pigments may thus be compared and given a significant numerical relative gloss rating.

DISPERSION

Dispersion refers to the movement of wetted particles into the body of the liquid vehicle to effect a permanent particle separation (Paint Flow and Pigment Dispersion by T. C. Patton, 1964, Wiley, p. 217). In testing samples for improved dispersion, the Cowles dispersion test was used. For example, 582 grams of the $TiO_2$ pigment were mixed with a vehicle consisting of 116 grams of Aroplaz 2502, 14 grams of soya lecithin and 39 grams of mineral spirits and ground in the Cowles Dissolver, a mixing and dispersing apparatus that utilizes a hi-shear, saw-toothed impeller to impart the grinding action. The mix was ground for 3 minutes. The sides of the grinder were scraped down, and the mix was ground for an additional 7 minutes. A 150 gram portion of this grind base was poured directly into a friction top can containing the following reduction ingredients: 66 grams of Aroplaz 2502, 30 grams of mineral spirits, 2.2 grams of 24% lead naphthanate, 1.2 grams of 6% cobalt naphthenate, and 0.5 gram of antiskin agent. The can was sealed and placed on a paint shaker for 15 minutes. Drawdowns of the resulting paint were made over polished glass plates using a .004 inch clearance blade. The plates were baked in an oven at 250–300° F. for 15–20 minutes and rated by comparing with standards. Grading was done either under a film fineness viewing device or by inspection under a strong 500 watt projector light striking the panels at a very low angle.

Commercial triethanolamine which, contains, in addition to 80 to 85% triethanolamine, about 15% of diethanolamine, and 1 to 2.5% monoethanolamine, is used for this treatment. Purified triethanolamine may be used.

This process is applicable to titanium dioxide pigments produced by either the hydrolysis or vapor phase oxidation methods.

Addition of triethanolamine before the first pass has no effect on the pigment dispersion, also there is no significant increase in dispersion by ordinary remicronizing. It is the proper sequence of these operations that produces pigment with high gloss and dispersibility.

There is a critical steam-to-pigment ratio between 0.5 and 2 on the second pass. Steam-to-pigment ratio on the first pass is less important.

Pigments produced by this invention have the following characteristics: high hiding, durability, high gloss and easy dispersion. They may be used to best advantage in paint systems that call for these characteristics, such as automotive finishes.

The following examples illustrate the invention, but should not be considered as limitations thereof.

Examples 1 and 2

Two samples, each 2000 parts by weight, of $TiO_2$ produced by the rutile-seeded hydrolysis of titanium sulfate solution, as described in U.S. Patents 2,511,218 and 2,479,637, and treated prior to calcination with alkali metal salts and zinc salts, as described in U.S. Patent 2,369,246, followed by treatment with hydrous oxides of titania, silica and alumina, as described in U.S. Patent 2,387,534, were ground at steam-to-pigment ratios and 1.1 and 5.7 in a 36″ micronizer mill. As seen in the tabulation hereinbelow at the higher steam-to-pigment ratio of Example 2 the gloss was much higher but the dispersion was much lower. These once-ground products of Examples 1 and 2 were treated with 8 parts by weight of triethanolamine by dripping a 50% triethanolamine-water solution onto the pigment and the treated pigments were subjected to a second micronizing step, at a steam-to-pigment ratio of 1:1. Example 1 clearly shows the advantages of the second micronizing operation with triethanolamine addition by the 19 points improvement in gloss and the high dispersion value, 9. Comparing the gloss values for Examples 1, 2nd pass, and Example 2, 1st pass, it can be seen that equivalent gloss was obtained in Example 1 with a total steam-to-pigment ratio, for the two passes, of 2.1 as compared to the steam-to-pigment ratio of 5.7 for the first pass of Example 2. Also, in Example 2, where the high steam-to-pigment ratio in the first pass had degraded the dispersion value to 3, it was possible to improve this dispersion to a high level, 8, by the remicronizing with triethanolamine addition.

| | 1st pass (without triethanolamine) | | | 2nd pass (with 8 parts by weight of triethanolamine) | | |
|---|---|---|---|---|---|---|
| | S/P | Gloss | Dispersion | S/P | Gloss | Dispersion |
| Ex. 1 | 1.1 | 49 | 8.5 | 1.0 | 68 | 9 |
| Ex. 2 | 5.7 | 68 | 3 | 1.0 | 75 | 8 |

Example 3

Two thousand parts of $TiO_2$ produced by the method described in Example 1 but without zinc salt addition was micronized with 8 parts by weight of triethanolamine added between the two micronizing steps.

1st pass:
 S/P _____ 1.78
 Gloss _____ 65
 Dispersion _____ 5
2nd pass:
 S/P _____ 1.02
 Gloss _____ 72
 Dispersion _____ 9

Example 4

Two thousand parts of $TiO_2$ produced by the vapor phase oxidation process described in U.S. Patents 2,791,490 and 2,559,638 was micronized by the method described in Example 1 with 8 parts by weight of triethylanolamine added between the two micronizing steps.

1st Pass:
 S/P _____ 1.86
 Gloss _____ 71
 Dispersion _____ 8
2nd pass:
 S/P _____ 1.90
 Gloss _____ 76
 Dispersion _____ 9

I claim:
1. In a process for the preparation of titanium dioxide pigments having improved gloss characteristics and good dispersion properties which comprises the steps of (1) grinding a titanium dioxide pigment in a fluid energy mill, and (2) adding 0.1 to 1.0% by weight, based on the weight of the original pigment, of triethanolamine, the improvement which comprises (3) grinding the so-treated pigment in a fluid energy mill at a controlled energy level in the range of 0.5:1 to 2:1 ratio of steam to pigment by weight, the fluid energy milling in step (1) being carried out at a higher steam-to-pigment weight ratio than is the fluid energy milling in step (3).

2. A process of claim 1 in which the proportion of added triethanolamine added is in the range of 0.3 to 0.5% by weight, based on the weight of pigment.

References Cited

UNITED STATES PATENTS 3,147,131  9/1964  Kingsbury _____ 106—300
3,178,121  4/1965  Wallace _____ 241—5

FOREIGN PATENTS 1,022,621  3/1966  Great Britain.

GERALD A. DOST, *Primary Examiner.*